United States Patent Office 3,511,634
Patented May 12, 1970

3,511,634
HERBICIDAL ORGANOPHOSPHORUS-NITROGEN
COMPOSITIONS AND METHOD USING SAME
Joseph P. Kleiman, Royal Oak, Mich., and Robert L.
Mack, Baton Rouge, La., assignors to Ethyl Corporation, New York, N.Y., a corporation of Virginia
No Drawing. Filed Aug. 4, 1967, Ser. No. 658,340
Int. Cl. A01n 9/36
U.S. Cl. 71—86       9 Claims

ABSTRACT OF THE DISCLOSURE

Formulations containing organophosphorus-nitrogen compounds are useful in controlling undesirable vegetation and as plant defoliants. The active organophosphorus-nitrogen compounds have the general formula:

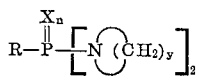

wherein R is an alkyl, alkenyl, aryl, alkaryl, aralkyl, or alicyclic hydrocarbon group having up to about 12 carbon atoms, X is oxygen, sulfur, or selenium, $n$ is zero or one, and $y$ is an integer from two to nine.

BACKGROUND OF THE INVENTION

This invention relates to the control of undesirable vegetation in general. More specifically, it pertains to the partial or total modification of the growth of plants, including defoliation and the complete suppression or eradication of plants. Many of the compounds employed in this invention and a process for their preparation have been reported in the literature; Michaelis, Chem. Ber. 31, 1037 (1898).

SUMMARY OF THE INVENTION

The instant invention is directed to controlling undesirable vegetation by a method which comprises contacting the vegetation with a herbitoxic amount of an organophosphorus-nitrogen compound. The herbitoxic compositions of this invention may be in the form of a solution, an emulsifiable oil, a wettable powder, dust, granules, or aerosol. Depending on the specific type of the formulation, there may additionally be present a surfactant, a carrier, or an adjuvant.

DESCRIPTION OF THE PREFERRED EMBODIMENTS

The novel herbitoxic compositions of this invention contain as an active ingredient an organophosphorus-nitrogen compound having the formula:

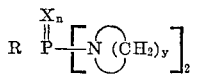

wherein R is a hydrocarbon group having up to about 12 carbon atoms, or a hydrocarbon group containing various substituents thereon, and being selected from the group consisting of alkyl, alkenyl, aryl, alkaryl, aralkyl and alicyclic groups; X is oxygen, sulfur or selenium, $n$ is zero or one, and $y$ is any integer from two to nine and preferably four or five.

Examples of alkyl groups which may be present in the above general formula are methyl, ethyl, propyl, isopropyl, n-butyl, isobutyl, sec-butyl, tert-butyl, n-amyl, and the various positional isomers thereof as, for example, 1-methylbutyl, 2-methylbutyl, 3-methylbutyl, 1,1-dimethylpropyl, and the like, and likewise the corresponding straight- and branched-chain isomers of hexyl, heptyl, octyl, nonyl, decyl, undecyl, and dodecyl.

Examples of alkenyl groups that may be employed in the compounds of this invention are ethenyl, 1-propenyl, 2-propenyl, isopropenyl, 1-butenyl, 2-butenyl, 3-butenyl, and the corresponding branched-chain isomers thereof such as 1-isobutenyl, 2-isobutenyl, 1-sec-butenyl, 2-sec-butenyl, including 1-methylene-2-propenyl, 1-pentenyl, 2-pentenyl, 3-pentenyl, 4-pentenyl, and the corresponding branched-chain isomers thereof as well as all isomers of hexenyl, heptenyl, octenyl, nonenyl, decenyl, undecenyl, and dodecenyl as, for example, 2,3-dimethyl-1-butenyl, 2,3-dimethyl-2-butenyl, 1-methyl-1-ethyl-2-propenyl, and the like.

Examples of aryl groups which may be present in the above formula are phenyl and naphthyl groups. Alkaryl groups which may also be present are tolyl, 2,3-xylyl, 2,4-xylyl, 2,5-xylyl, 2,6-xylyl, 3,4-xylyl, 3,5-xylyl, o, m, and p-cumenyls, mesityl, o, m, and p-ethylphenyl 2-methylnaphthyl 3-methylnaphthyl, 4-methylnaphthyl, 5-methylnaphthyl, 6-methylnaphthyl, 7-methylnaphthyl, 8-methylnaphthyl, 1-ethylnaphthyl, the various positional isomers of these naphthyl radicals, and the like. Some of the examples of aralkyl groups are benzyl, phenylethyl, α-phenylpropyl, β-phenylpropyl, α- and β-phenylisopropyl radicals, α and β-phenylbutyl radicals, and the like.

Alicyclic groups which may be present in the above formula are exemplified by cyclopropyl, cyclobutyl, cycloamyl, cyclohexyl, cycloheptyl, cyclooctyl, cyclononyl and the like, or alkyl derivatives of said alicyclic groups such as α-cyclobutylpropyl, β-cyclobutylpropyl, and similar higher derivatives.

In the preferred class of compounds, R is aryl, aralkyl, or alkaryl group having up to about 12 carbon atoms. The most preferred compounds are 1,1′-(phenylphosphinidene)dipiperidine, 1,1′ - (p - tolylphosphinidene)dipiperidine, 1,1′-(phenylphosphinidene)di - 2 - pipecoline, 1,1′-(phenylphosphinidene)di - 3 - pipecoline, phenyldipiperidinophosphine oxide, and benzyldipiperidinophosphine oxide.

Illustrative but non-limiting examples of typical active ingredients of this invention are listed below.

(1) 1,1′-(phenylphosphinidene)diaziridine
(2) 1,1′-(p-tolylphosphinidene)diazetidine
(3) 1,1′-[(3-n-propyl-p-tolyl)phosphinidene]dipiperidine
(4) 1,1′-(2-methyl-n-heptylphosphinidene)dihexamethylenimine
(5) 1,1′-(octadecylphosphinidene)bis(octahydro-1H-azonine)
(6) 2-nitro-α-(dipiperidinophosphino)-p-cresol
(7) 5-amino-2-[3-(di-1-hexamethyleniminylphosphino)-n-propyl]benzonitrile
(8) 1,1′-[(2-bromo-n-butyl)phosphinidene]di-3-pipecoline
(9) 1,1′-{[3-(3,4,5-tri-n-propylphenyl)-n-propyl]phosphinidene}di-3-pipecoline
(10) (3-iodo-4-p-tolyl)dipiperidinophosphine oxide
(11) (2,2′-dimethyl-n-butyl)dipiperidinophosphine oxide
(12) (4-aminobenzyl)dipiperidinophosphine sulfide
(13) 2-nitro-4-(dipiperidinophosphinyl)phenol
(14) 1,1′-(2-butenylphosphinidene)bis(3-ethyl-5-n-pentylpiperidine)
(15) (4-allylphenyl)dipiperidinephosphine oxide
(16) (4-amino-n-butyl)dipiperidinophosphine selenide
(17) 1,1′-[(8-nitro-n-octyl)phosphinidene]diazetidine
(18) 1,1′-[(4-chloro-2-methyl-n-pentyl)phosphinidene]dipiperidine
(19) 5-[2-(di-2-pipecoline-1-ylphosphino)ethyl]salicylonitrile
(20) (2-fluoro-n-butyl)bis(1-heptamethyleniminyl) phosphine sulfide
(21) 5-(di-hexamethyleniminylphosphinoselenoyl)-1-pentanol The above groups which may be present in the general formula may contain various substituents such as halogens, hydroxy, amino, nitro, cyano, and the like. Illustrative examples of groups having such substituents are chloromethyl, 2-bromobutyl, 1-iodo-2-propenyl, chlorophenyl, 4-chlorotolyl, 1-phenyl-2-chloropropyl, fluorocyclohexyl, 3-hydroxypropyl, 1-hydroxy-3-pentenyl, hydroxyphenyl, 2-hydroxytolyl, 1-phenyl-3-hydroxypentyl, hydroxycyclopentyl, 2-nitrobutyl, nitrophenyl, 2-nitrotolyl, 1-phenyl-4-nitrohexyl, nitrocyclobutyl, 2-aminobutyl, 3-aminobutenyl-1, aminophenyl, 2-nitro-4-aminophenyl, 2-chloro-3-nitrophenyl, 1-hydroxy-3-bromohexyl, and the like.

The class of compounds represented by the above general formula may be prepared by various methods available in the art. For the purpose of this invention, it is immaterial what specific method of preparation is employed since our invention is primarily concerned with the unobvious useof said class of compounds as herbitoxic materials. One method of preparation of the active compounds of this invention is reported by Michaelis, Chem. Ber. 31, 1037 (1898).

In a preferred embodiment, the compositions of this invention contain an active ingredient (a compound of the type formulated and enumerated above and exemplified below) and a surfactant as a dispersant therefor. In a more preferred embodiment, the herbitoxic compositions contain an inert carrier as well as a surfactant and active ingredient. Typical surfactants and carriers employed in this invention are discussed below.

The methods provided by this invention for treating undesirable vegetation comprise contacting living plant tissue with one or more of the active ingredients described and enumerated above and exemplified below. In a more preferred embodiment, undesirable vegetation is treated with a composition comprising one or more active ingredient, a surfactant as a dispersant therefor, and an inert carrier.

The surfactants or conditioning agents employed in the instant invention extend the active ingredient and promote its intimate contact with the vegetation to which it is appled. They also aid in the adaptation oif the active ingredients for use in conventional application equipment. In general, from 0.1 to 15 percent by weight of a surfactant is employed in the compositions of this invention; however, greater and smaller amounts can be used, if desired.

Typical examples of surfactants which are suitable for use in this invention are soaps, saponins, gelatin, casein, flour, sulfite lye, synthetic cationic, anionic, and nonionic surfactants and the like. Detailed lists of such agents are set forth by J. W. McCutcheon in "Soap and Chemical Specialities," December 1957; January, February, March, and April 1958; and in "Detergent and Emulsifiers Up to Date—1960," John W. McCutcheon, Inc., 475 Fifth Ave., New York, N.Y. A further discussion of surface active wetting agents is set forth by D. E. H. Frear in "Chemistry of Insecticides, Fungicides and Herbicides," 277–287, published by D. Van Nostrand Company, Inc. (1948).

The materials commonly known as carriers comprise another type of ingredient which is preferably employed in the compositions of this invention. The purpose of a carrier is to extend and facilitate the application of the active ingredient to the vegetation upon which it is applied. In general, carriers may be of two types; vis, solids and liquids. Liquid carriers include well-known liquids such as water and various organic formulations. Typical liquid organic carriers are petroleum fractions such as kerosene and diesel fuel, aromatics such as benzene and toluene, ketones such as acetone and methylethylketone, esters such as amyl acetate, octyl acetate, and the like.

Typical solid carriers are inert solid extenders of mineral origin such as fuller's earth, kaolin, bentonite, China clay, various magnesium silicates, gypsum, pumice, mica, talc, attapulgite clay, and the like. Inert extenders of vegetable origin, such as soy bean flour, tobacco flour, ground walnut shells, ground pecan shells, and the like can also be employed.

The herbicidal compositions of the present invention can also beneficially contain other adjuvants. Examples of such further adjuvants are corrosion inhibitors, perfumes, dyes, odor-masking agents and stabilizers. In addition, other herbicidal, fungicidal, or insecticidal agents might be mixed with the herbicidal compositions of this invention in order to obtain enhanced or dual eifects from the application of the resultant composition.

One formulation for applying the active compounds of this invention to undesirable plants in a solution or suspension of the active compound in a suitable aqueous or organic medium. The organic medium may be a volatile solvent or it may be a higher boiling solvent such as kerosene.

When using a solution or suspension formulation, a preferred active ingredient concentration range is from about 0.5 to 100 parts by weight active ingredient per 250 parts by weight of formulation, although more or less can be used. A more preferred concentration range is from about 1 to 50 parts by weight active ingredient per 250 parts of formulation. A most preferred concentration range is from about 1 to 10 parts by weight active ingredient per 250 parts of formulation.

Emulsifiable oil formulations which are solutions or suspensions of the active compound in water-immiscible solvents together with a surface active agent may also be used. In these formulations the water-immiscible solvent is the carrier. Suitable water-immiscible solvents for the active compound of this invention are hydrocarbons, such as kerosene, or xylene, and water-insoluble ethers such as dibutyl Carbitol and dibutyl Cellosolve, esters such as amyl acetate and octyl acetate, and ketones such as methyl ethyl ketone or dioctyl ketone. The solvent concentration may be from 10 to 50 to about 70 weight percent. The surfactant may be employed in a concentration from 0.5 to about 15 weight percent.

A preferred active ingredient concentration of the emulsifiable oil formulations of the present invention is from about 10 to about 90 weight percent. A more preferred active ingredient concentration in these formulations is from about 20 to about 75 weight percent. A most preferred active ingredient concentration in the emulsifiable oil formulations of this invention is from about 25 to about 50 weight percent.

The compositions of this invention may be formulated in the form of wettable powders. These are water dispersible compositions which contain, in addition to the active compound, an inert solid extender and one or more surfactants which perform the functions previously set out. The preferred inert solid extenders used in this invention are of mineral origin, such as fuller's earth, koalin, bentonite, China clay, and the like.

A preferred active ingredient concentration of the wettable powder formulations of this invention is from about 10 to about 90 weight percent. A more preferred active ingredient concentration is from about 20 to about 80 weight percent, and a most preferred active ingredient concentration in the wettable powder formulations of this invention is from about 50 to about 80 weight percent. The surfactant concentration may be from 0.5 to about 15 weight percent and preferably from 1 to about 5 weight percent. An inert carrier may be used in the amount from 10 to 90 weight percent and more preferably from 10 to 50 weight percent.

Dusts are powder formulations which are intended for application in the dry form. The dust should be free flowing and have a high density. Dust formulations can contain the active compounds, an inert extender, a surfactant, and may also contain a wetting agent and a grinding aid.

A preferred active ingredient concentration employed in the dust compositions of this invention is from about 0.1 to about 25 weight percent, and more preferably, from about 1 to about 10 weight percent. The surfactant concentration may be from about 0.01 to about 5 weight percent, and more preferably, from about 0.5 to about 1 weight percent. The balance of the dust compositions of this invention comprise inert free flowing dust and any other adjuvants that might be desired, such as corrosion inhibitors, anti-foam agents, dyes, and the like.

Granule formulations may also be employed. Granules are compositions of macroscopic dimension containing the active ingredient, generally a surface active agent, and a carrier. Suitable carriers for granule formulations are clays, pyrophyllite and vermiculite.

A preferred active ingredient concentration of the granular formulations of this invention is from about 1 to about 50 weight percent, and more preferably, from about 5 to about 30 weight percent. A preferred surfactant concentration employed in the granular formulations is from about 0.01 to about 10 weight percent, and a more preferred is from about 0.1 to about 1 weight percent. The balance of the granular formulations is preferably made up of about 15 to 30 mesh particulate inert mineral carrier.

The compounds of this invention are also effective when formulated in aerosol formulations. In these formulations, the active compounds are dissolved in an extremely volatile solvent known in the art for this purpose and maintained under pressure in a confined space.

The active ingredients described in this invention are also useful in colloidal formulations. A colloidal formulation is prepared by passing a mixture of the active ingredient, a hydrocarbon solvent, and a large amount of water through a colloid mill until homogenation of the oil and water is achieved.

The above-discussed formulations and additives are disclosed in greater detail in a copending application Ser. No. 530,778, filed Mar. 1, 1966, now U.S. Patent No. 3,409,424.

The compounds used in the following Examples 1 to 7 will have the designations given below:

(A) 1,1'-(phenylphosphinidene)dipiperidine
(B) 1,1'-(p-tolylphosphinidene)dipiperidine
(C) 1,1'-(phenylphosphinidene)di-2-pipecoline
(D) 1,1'-(phenylphosphinidene)di-3-pipecoline
(E) 1,1'-(methylphosphinidene)dipiperidine
(F) Benzyldipiperidinophosphine oxide
(G) Di-1-azetidinylethylphosphine oxide
(H) Phenyldipiperidinophosphine oxide The following examples serve to illustrate the herbitoxic formulations of this invention. All percentages are by weight.

EXAMPLE 1

| | Percent |
|---|---|
| Compound A | 50 |
| Bentonite | 49 |
| Sodium alkyl benzene sulfonate | 1 |

The above wettable powder is prepared by blending the dry components and grinding until substantially all of the particles are smaller than 50 microns.

For application, the above wettable powder is dispersed in water in quantities equivalent to one pound of active ingredient per 30 gallons of water. The dispersion so formed is conveniently applied by the use of any of the various commercial sprayers.

EXAMPLE 2

| | Percent |
|---|---|
| Compound B | 90 |
| Sodium alkyl naphthalene sulfonate | 0.5 |
| Kaolin | 9.5 |

The above wettable powder is prepared in the same manner as in Example 1. For application, it is dispersed in water at a rate equivalent to 10 pounds of active ingredient per 30 gallons of water.

In the above example, similar formulations are prepared containing 20, 30, 40, 50, 60, 70, 80, or 90 percent Compound C and correspondingly smaller amounts of carrier.

EXAMPLE 3

| | Percent |
|---|---|
| Compound D | 10 |
| Talc | 80 |
| Diatomaceous silica | 8 |
| Fatty acid amides | 2 |

The above dust is prepared by first grinding together the active ingredients, diatomaceous silica and fatty acid amide and then blending in the talc and thoroughly mixing.

This dust formulation can be applied using a tractor or airplane-mounted duster, at a rate of about 5 pounds of active ingredient per acre.

EXAMPLE 4

| | Percent |
|---|---|
| Compound E | 25 |
| Diesel fuel | 65 |
| Alkylaryl polyether alcohols | 10 |

The above emulsifiable oil is prepared by mixing the components until a homogeneous solution results.

The above composition is conveniently applied by dispersing the composition in water at a rate equivalent to two pounds of active ingredient per 30 gallons of water. It may then be applied using any suitable commercial sprayer.

In the above example, similar formulations are prepared containing 10, 20, 30, 40, 50, 60, 70, 80, or 90 percent Compound E and correspondingly smaller amounts of diesel fuel.

EXAMPLE 5

| | Percent |
|---|---|
| Compound F | 30 |
| Sodium alkyl naphthalene sulfonate | 5 |
| Attapulgite (15–30 mesh) | 65 |

The above granular composition is prepared by first dissolving the active ingredient and surface active agent in water and then spraying the solution on the carrier. Following this, the granules are dried. It may then be applied to plant tissue at a rate of from about 1 to 10 pounds of active ingredients per acre.

In the above example, similar formulations are prepared containing 10, 40, 60, 80, and 90 percent of Compounds E and F, and correspondingly smaller amounts of the attapulgite.

EXAMPLE 6

Into a cylinder rated at 100 p.s.i.g. working pressure is introduced 10 parts of Compound G. The cylinder is then made pressure tight except for one opening, through which is introduced a mixture of 10 parts of acetone and 50 parts of dichlorodifluoromethane, from a container holding this material under 2000 p.s.i.g. The cylinder into which the ingredients have been introduced is then sealed off and shaken to give a uniform solution of the active compound in the volatile solvents. When sprayed into the atmosphere this solution will form an effective aerosol of the active compound employed.

In the above example, similar formulations are prepared containing 10, 30, 60 and 90 percent of Compound G and correspondingly smaller amounts of the solvent.

EXAMPLE 7

A colloidal formulation is prepared by passing a mixture of 10 parts of Compound H, 100 parts of kerosene, 1000 parts of water, and 1 part of mannitan monooleate through the colloid mill until homogenation of the oil in water is achieved.

EXAMPLES 8 to 154

Compounds 1–21 set forth above are incorporated, one at a time, in each of the foregoing Examples 1 through 7.

The compositions of this invention are extremely useful when employed in the method of this invention for controlling the growth of undesirable vegetation. Not only are phytotoxic to many undesirable plants, butt they are also useful as defoliants. The compositions of this invention are active as plant growth regulants at rates as low as one-tenth pound of active ingredient per acre. A preferred application rate is from 1 to 60 pounds of active ingredients per acre, and a most preferred application rate is from 5 to 10 pounds of active ingredient per acre. Higher or lower rates can be employed, depending upon the effect that the particular user desires to accomplish.

The compositions of the present invention are usually contacted with the leaves and stems of growing plants in the term's broadest sense, but can be applied to soil to obtain pre-emergence herbitoxic effects.

As appreciated in the art, the morphological effect obtained with the active ingredients of this invention may be influenced by the application rate, ambient temperature, humidity, and the time of the life cycle of the plant to which the compositions are applied. The effect usually desired of plant growth regulators is either defoliation or complete eradication of undesirable species. It is in these particular applications that the compositions of this invention are most useful. The following tests were carried out in order to demonstrate the useful properties of the compositions of this invention.

In test procedure A, the compounds were formulated as follows. Each compounds was weighed into a small aluminum cup. The material was then washed into small beakers with about 5 ml. of acetone, followed by 15 ml. of water, giving a total volume of 20 ml. A quantity of this material containing 31 mg. of the test compound was then removed and water added to it to bring its volume to 11 ml. At this point, 0.5 ml. of a one weight percent solution of Triton X-155 was added to the test solution and its volume then raised to 15 ml. by the addition of water. When this test solution is sprayed over an area of one-third square yard, it approximates an application rate of 30 gallons per acre containing one pound of test chemical per acre.

In some experiments the test compound was merely dissolved in acetone, so that 12 ml. of acetone solution contained 31 mg. of test compound.

The spray chamber used in carrying out subsequent tests was about 36 inches wide, 18 inches deep, and 26 inches high. It was made of clear plastic and the front of the chamber had sliding doors suitable for placing plants in and removing plants from the chamber. The top of the chamber had a hole for introducing the spray.

The compounds were examined by spraying them on 14-day-old Black Valentine bean plants and in some instances on privet plants at a rate equivalent to one pound of test compound per acre.

In the following Table I, the effectiveness of the compounds of this invention are expressed in terms of their phytotoxicity and their ability to cause abscission (defoliation). The abscission value is expressed in terms of the percentage drop of the total leaves on the plant (percent defoliation). At the time of spraying, the bean plants usually have two primary leaves. However, during the 14 days the plant is observed following spraying, two more (trifoliate) leaves usually emerge. Dropping of the two primary leaves would be recorded as 50 percent abscission. Dropping of all four leaves would be recorded as 100 percent abscission. Actually, dropping of the two primary leaves would constitute a total drop of all leaves actually contacted with the test compound.

Phytotoxicity is a measure of leaf damage (not to be confused with leaf droppage) and is estimated visually on a scale from 0 to 11, where 0 indicates no effect and 11 indicates all leaves killed. It is possible for a test chemical to have a phytotoxicity rating of 11 and yet have an abscission rating of 0, which means that although all leaves were killed, they remained on the plant.

Table I records the results obtained when test formulations containing representative compounds of this invention were contacted with the previously described Black Valentine bean plants at a rate equivalent to one pound per acre. Results are given for the water and acetone formulation previously described. Observations were made at specific intervals, such as at 4, 8, and 13 days, but only the final results obtained at the end of 13 days are reported.

TABLE I.—ABSCISSION AND PHYTOTOXICITY RATINGS ON BLACK VALENTINE BEANS

| Compound | Concentration | Percent Defoliation | Phytotoxicity |
|---|---|---|---|
| 1,1'-(phenylphosphinidene)dipiperidine. | 0.1 lb./acre (water) | 0 | 2 |
| Do | 1.0 lb./acre (water) | 47 | 1 |
| Do | 1.0 lb./acre (acetone) | 45 | 2 |
| 1,1'-(p-tolylphosphinidine)dipiperidine | 0.1 lb./acre (water) | 0 | 0 |
| Do | 1.0 lb./acre (water) | 40 | 3 |
| Do | 1.0 lb./acre (acetone) | 40 | 3 |
| 1,1'-(phenylphosphinidene)di-2-pipecoline. | 0.1 lb./acre (water) | 32 | 1 |
| Do | 1.0 lb./acre (water) |  | 11 |
| Do | 1.0 lb./acre (acetone) | 25 | 8 |
| 1,1'-(phenylphosphinidene)di-3-pipecoline. | 0.1 lb./acre (water) | 0 | 1 |
| Do | 1.0 lb./acre (water) | 8 | 9 |
| Do | 1.0 lb./acre (acetone) | 19 | 4 |
| Phenyldipiperidinophosphine oxide | 0.1 lb./acre (water) | 5 | 5 |
| Do | 1.0 lb./acre (water) | 25 | 6 |
| Do | 1.0 lb./acre (acetone) | 35 | 5 |
| Benzyldipiperidinophosphine oxide | 0.1 lb./acre (water) | 20 | 2 |
| Do | 1.0 lb./acre (water) | 0 | 11 |
| Do | 1.0 lb./acre (acetone) | 15 | 6 |

Further tests were carried out to demonstrate the selectivity of the compositions of this invention. Test procedure B consisted of formulating the test compound in either water or acetone mixtures as previously described. The formulated test compounds were then sprayed on American Elm, Pin Oak, Euonymus, and Boxwood. Observations were made at specific intervals, such as at the end of 3, 8 and 13 days. The extent of abscission (defoliation) was rated as either light (L), moderate (M), severe (S), or total (T). The phytotoxicity was rated on the same scale (0 to 11) as was used in the Black Valentine bean tests. Table II below shows the results obtained when 1,1'-(phenylphosphinidene)di-2-pipecoline was used at rates equivalent to 1 and 5 pounds per acre.

TABLE II.—ABSCISSION AND PHYTOTOXICITY RATINGS OF 1,1'-(PHENYLPHOSPHINIDINE)DI-2-PIPECOLINE ON DECIDUOUS AND EVERGREEN TREES

|  | Abscission | Phytotoxicity |
|---|---|---|
| American Elm: |  |  |
| 1 lb./acre (water) | O | 2 |
| 5 lb./acre (water) | L | 11 |
| 5 lb./acre (acetone) | L | 5 |
| Pin Oak: |  |  |
| 1 lb./acre (water) | L | 8 |
| 5 lb./acre (water) | T |  |
| 5 lb./acre (acetone) | S | 8 |
| Euonymus: |  |  |
| 1 lb./acre (water) | O | 0 |
| 5 lb./acre (water) | O | 1 |
| 5 lb./acre (acetone) | L | 1 |
| Boxwood: |  |  |
| 1 lb./acre (water) | L | 2 |
| 5 lb./acre (water) | L | 3 |
| 5 lb./acre (acetone) | L | 2 |

Still further tests were carried out on the compounds of this invention to more fully determine the effectiveness of such compounds. In test procedure C, the test compound was dissolved in acetone containing 0.5% Tween–20. The concentrations were adjusted so that rates of 1.0 lb./acre and 0.1 lb./acre could be applied. Each rate was applied in duplicate to six different 7-day old species.

TABLE III.—SUMMARY HERBICIDAL PROPERTIES

| Compound | Concentration (lb./acre) | Rating (based on a maximum value of 24) |
|---|---|---|
| 1,1'-(phenylphosphinidene) dipiperidine | 0.1 | 6 |
| Do | 1.0 | 11 |
| 1,1'-(p-tolylphosphinidene) dipiperidine | 0.1 | 6 |
| Do | 1.0 | 17 |
| 1,1'(phenylphosphinidene) di-2-pipecoline | 0.1 | 16 |
| Do | 1.0 | 24 |
| 1,1'-(phenylphosphinidene) di-3-pipecoline | 0.1 | 14 |
| Do | 1.0 | 24 |
| Phenyldipiperidinophosphine oxide | 0.1 | 6 |
| Do | 1.0 | 13 |
| Benzyldipiperidinophosphine oxide | 0.1 | 7 |
| Do | 1.0 | 21 |

In test procedure D, the test compounds dissolved in acetone containing 0.5% Tween 20 were sprayed at 10, 5 and 1 lb./acre concentrations on usually eight species: Hemlock, Spruce, Elm, Locust, Maple, Oak, Privet, and Pine. In some instances, Maple is not used. After about two weeks, the results of the test were noted and expressed as none (—), slight (S), moderate (M), or extreme (E) abscission and contact effect (desiccation), as shown in Table IV below.

TABLE IV.—ABSCISSION AND CONTACT RATINGS

| Compound and concentration | Hemlock | | Spruce | | Elm | | Locust | | Oak | | Privet | | Pine | | Maple | |
|---|---|---|---|---|---|---|---|---|---|---|---|---|---|---|---|---|
|  | Abscission | Contact | Abscission | Contact | Abscission | Contact | Abscission | Contact | Abscission | Contact | Abscission | Contact | Abscission | Contact | Abscission | Contact |
| 1,1'-(phenylphosphinidene) dipiperidine: |  |  |  |  |  |  |  |  |  |  |  |  |  |  |  |  |
| 1 lb./acre | M | M | — | S | M | M | E | E | — | S | — | S | — | S | + | + |
| 5 lb./acre | — | S | — | S | S | M | E | E | — | M | — | S | — | S | + | + |
| 10 lb./acre | S | M | — | M | E | E | E | E | — | E | S | M | — | S | + | + |
| 1,1-(p-tolylphosphinidene) dipiperidine: |  |  |  |  |  |  |  |  |  |  |  |  |  |  |  |  |
| 1 lb./acre | — | S | — | S | M | M | M | S | — | M | — | S | — | S | + | + |
| 5 lb./acre | — | S | S | M | E | M | M | M | — | M | — | S | — | S | + | + |
| 10 lb./acre | S | M | M | E | E | E | M | E | M | E | M | E | — | S | + | + |
| Phenyldipiperidinophosphine oxide: |  |  |  |  |  |  |  |  |  |  |  |  |  |  |  |  |
| 1 lb./acre | — | S | S | M | — | M | — | M | — | M | — | — | — | — | + | + |
| 5 lb./acre | — | S | S | M | S | M | — | E | — | E | — | M | — | S | + | + |
| 10 lb./acre | S | S | S | M | E | E | M | E | — | E | — | M | — | S | + | + |
| Benzyldipiperidinophosphine oxide: |  |  |  |  |  |  |  |  |  |  |  |  |  |  |  |  |
| 1 lb./acre | — | — | — | — | S | M | S | E | S | M | — | S | — | — | — | S |
| 5 lb./acre | — | S | — | M | — | M | M | E | S | M | — | S | — | S | — | M |
| 10 lb./acre | — | M | S | M | S | M | M | M | — | E | S | M | — | S | — | E |

S=Slight, M=Moderate, E=Extreme, —=No Effect, +=Maple not used.

The test plants used were Black Valentine bean, Heavenly Blue Morning-Glory, Scarlet Globe Radish, Lincoln Soybean, Clinton Oats and Rice (P.I. 8970). At selected time intervals, the following effects were noted: abscission, chlorosis, contact injury, curvature, formative effects, galling, killing, necrosis, abnormal pigmentation, quilling, adventitious roots, and stunting. A rating system ranging from a value of 1 to 4 was used for each species. When the plant appeared normal, a rating of one was assigned, whereas when the plant was killed, a value of 4 was assigned. Thus, the ratings are such that a maximum value of 4 for each species may be obtained. Since there are six species and each may obtain a value of from one to four, the overall result will always fall within the range of from 6 to 24. The latter indicates complete kill of all the species. The former indicates no effect. Final readings are obtained 10 to 14 days after application. The following Table III shows the final overall result obtained when the indicated organophosphorus compounds were applied on the above-described six species.

As noted above, certain herbitoxic formulations require an organic medium or a solvent. In addition to the solvents and the organic medium materials listed above, alcohols and sulfoxides may also be employed. Non-limiting examples of alcohols are 1-butanol, cyclohexanol, 1-octanol, 1-nonanol, and the remaining positional isomers, 2-methyl-1-nonanol, 2,8-dimethyl-5-nonanol, 1-dodecanol, 6-dodecanol, 1-tetradecanol, all positional isomers thereof, and the like. Illustrative examples of sulfoxides are dimethyl sulfoxide, diethyl sulfoxide, di-n-propyl sulfoxide, di-n-butyl sulfoxide, dibenzyl sulfoxide, and the like.

This invention can be extended to the treatment of species of plants other than those mentioned above, such as algae.

Having fully described the compositions of this invention and their novel uses, it is desired that this invention be limited only within the lawful scope of the appended claims.

What is claimed is:

1. A method of controlling undesirable vegetation, said method comprising contacting said vegetation with a herbicidal amount of a compound having the formula:

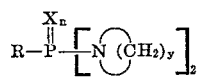

wherein R is selected from the group consisting of alkyl, alkenyl, aryl, alkaryl, aralkyl, and alicyclic grops, said R having up to about 12 carbon atoms; X is selected from the group consisting of oxygen and sulfur; $n$ is an integer from zero to one, and $y$ is an integer from two to nine.

2. The method of claim 1 wherein R is selected from the group consisting of aryl, aralkyl and alkaryl groups.

3. The method of claim 1 wherein said R group contains an aryl radical.

4. The method of claim 1 wherein said compound is 1,1-(phenylphosphinidene)dipiperidine.

5. The method of claim 1 wherein said compound is 1,1-(p-tolylphosphinidene)dipiperidine.

6. The method of claim 1 wherein said compound is 1,1-(phenylphosphinidene)di-2-pipecoline.

7. The method of claim 1 wherein said compound is 1,1-(phenylphosphinidene)di-3-pipecoline.

8. The method of claim 1 wherein said compound is phenyldipiperidinophosphine oxide.

9. The method of claim 1 wherein said compound is benzyldipiperidinophosphine oxide.

References Cited

UNITED STATES PATENTS 3,111,525  11/1963  Meltzer et al. _____ 71—86 X
3,433,623  3/1969  Bayer et al. _____ 71—86

JAMES O. THOMAS, JR., Primary Examiner

U.S. Cl. X.R.

71—71, 87